US012598045B2

(12) United States Patent
Yang et al.

(10) Patent No.: US 12,598,045 B2
(45) Date of Patent: Apr. 7, 2026

(54) INDICATION INFORMATION TRANSMISSION METHOD, APPARATUS, AND SYSTEM

(71) Applicant: HUAWEI TECHNOLOGIES CO., LTD., Shenzhen (CN)

(72) Inventors: Fan Yang, Beijing (CN); Chao Li, Beijing (CN); Tianhong Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 18/344,028

(22) Filed: Jun. 29, 2023

(65) Prior Publication Data

US 2023/0344610 A1 Oct. 26, 2023

Related U.S. Application Data

(63) Continuation of application No. PCT/CN2020/142261, filed on Dec. 31, 2020.

(51) Int. Cl.
*H04L 5/00* (2006.01)
*H04W 64/00* (2009.01)
(Continued)

(52) U.S. Cl.
CPC ........... *H04L 5/0092* (2013.01); *H04W 64/00* (2013.01); *H04W 72/25* (2023.01); *H04W 72/51* (2023.01)

(58) Field of Classification Search
CPC .... H04L 5/0092; H04W 64/00; H04W 72/25; H04W 72/51
See application file for complete search history.

(56) References Cited

U.S. PATENT DOCUMENTS

2020/0314612 A1* 10/2020 Kang .................... H04W 72/20

FOREIGN PATENT DOCUMENTS

CN       110958586 A     4/2020
WO    2022028268 A1     2/2022

OTHER PUBLICATIONS

Extended European Search Report issued in corresponding European Application No. 20967782.2, dated Dec. 12, 2023, pp. 1-7.

* cited by examiner

*Primary Examiner* — Mohammad S Anwar
(74) *Attorney, Agent, or Firm* — HAUPTMAN HAM, LLP

(57) ABSTRACT

An indication information sending method includes receiving, by a second terminal apparatus, first information, and determining, based on the first information, whether the second terminal apparatus is capable of providing auxiliary resource information for a first terminal apparatus. The auxiliary resource information is for determining a sending resource of the first terminal apparatus. The method further includes, in response to the second terminal apparatus being capable of providing the auxiliary resource information for the first terminal apparatus, sending first indication information to the first terminal apparatus, where the first indication information includes the auxiliary resource information, or, in response to the second terminal apparatus being incapable of providing the auxiliary resource information for the first terminal apparatus, sending second indication information to the first terminal apparatus, where the second indication information indicates that the second terminal apparatus is incapable of providing the auxiliary resource information for the first terminal apparatus.

16 Claims, 5 Drawing Sheets

(51) Int. Cl.
   *H04W 72/25*          (2023.01)
   *H04W 72/51*          (2023.01)

| Zone 0 | Zone 1 | Zone 2 | Zone 0 | Zone 1 | Zone 2 |
|--------|--------|--------|--------|--------|--------|
| Zone 3 | Zone 4 | Zone 5 | Zone 3 | Zone 4 | Zone 5 |
| Zone 6 | Zone 7 | Zone 8 | Zone 6 | Zone 7 | Zone 8 |
| | | UE B | UE B_next | | |
| Zone 0 | Zone 1 | Zone 2 | Zone 0 | Zone 1 | Zone 2 |
| Zone 3 | Zone 4 | Zone 5 | Zone 3 | Zone 4 | Zone 5 |
| Zone 6 | Zone 7 | Zone 8 | Zone 6 | Zone 7 | Zone 8 |

INDICATION INFORMATION TRANSMISSION METHOD, APPARATUS, AND SYSTEM

CROSS-REFERENCE TO RELATED APPLICATIONS

This application is a continuation of International Application No. PCT/CN2020/142261, filed on Dec. 31, 2020, the disclosure of which is hereby incorporated by reference in its entirety.

TECHNICAL FIELD

This application relates to the field of wireless communication technologies, and in particular, to an indication information transmission method, an apparatus, and a system.

BACKGROUND

Vehicle-to-vehicle (V2V) communication, vehicle-to-pedestrian (V2P) communication, or vehicle-to-infrastructure/network (V2I/N) communication is a technology for directly performing communication between terminal devices, that is, direct communication. The V2V, the V2P, and the V2I/N are collectively referred to as V2X, namely, vehicle-to-everything communication.

In the V2X, a system supports two resource scheduling manners: a resource scheduling mode 1 (Resource Allocation Mode-1, RA mode-1) based on base station scheduling, and a resource scheduling mode 2 (Resource Allocation Mode-2, RA mode-2) based on perception and selection of a terminal apparatus on a preconfigured resource.

When a resource is determined in the mode-2, the terminal apparatus senses, on a predefined resource, a resource available to a sidelink, and selects a resource in the resource available to the sidelink to send the resource. A terminal apparatus other than the sending terminal apparatus may provide assistance for the sending terminal apparatus, to help the sending terminal apparatus determine a related resource. When a receiving terminal apparatus cannot provide assistance for the sending terminal apparatus or there are a large quantity of receiving terminal apparatuses, a terminal apparatus that provides assistance cannot be properly determined; consequently, resource selection reliability is reduced.

SUMMARY

An objective of this application is to provide an indication information transmission method, an apparatus, and a system, so as to improve resource selection reliability.

According to a first aspect, this application provides an indication information sending method, including: A second terminal apparatus receives first information, where the first information includes range indication information or direction indication information. The second terminal apparatus determines, based on the first information, whether the second terminal apparatus is capable of providing auxiliary resource information for a first terminal apparatus, where the auxiliary resource information is for determining a sending resource of the first terminal apparatus. When the second terminal apparatus is capable of providing the auxiliary resource information for the first terminal apparatus, the second terminal apparatus sends first indication information to the first terminal apparatus, where the first indication information includes the auxiliary resource information. Alternatively, when the second terminal apparatus is incapable of providing the auxiliary resource information for the first terminal apparatus, the second terminal apparatus sends second indication information to the first terminal apparatus, where the second indication information indicates that the second terminal apparatus is incapable of providing the auxiliary resource information for the first terminal apparatus.

According to the foregoing method, the second terminal apparatus receives the first information from the first terminal apparatus, determines, based on the range indication information or the direction indication information carried in the first information, whether the second terminal apparatus is capable of providing the auxiliary resource information for the first terminal apparatus. When determining that the second terminal apparatus is capable of providing the auxiliary resource information, the second terminal apparatus sends the auxiliary resource information to the first terminal apparatus. When determining that the second terminal apparatus is incapable of providing the auxiliary resource information, the second terminal apparatus feeds back, to the first terminal apparatus, that the second terminal apparatus cannot provide assistance. In this way, a terminal apparatus that can provide resource assistance is properly determined by using a geographical information indication such as the range indication information or the direction indication information, so that resource selection reliability is improved.

The method may be performed by a communication device or a communication apparatus that can support a communication device in implementing a function required by the method, for example, a chip. For example, the second terminal apparatus performing the foregoing method may be an apparatus, a chip that is disposed in a terminal apparatus and that is configured to implement a function of the terminal apparatus, or another component that is configured to implement the function of the terminal apparatus.

In an optional implementation, the range indication information indicates a geographical range in which a terminal apparatus that needs to feed back the auxiliary resource information is located; or the direction indication information indicates a geographical orientation, relative to the first terminal apparatus, of a terminal apparatus that needs to feed back the auxiliary resource information. A geographical location of the terminal apparatus that needs to be fed back may be determined by using the range indication information or the direction indication information carried in the first information. For example, the direction indication information may be bit information, and the corresponding geographical orientation is determined by using the bit information. The geographical range is relative to the first terminal apparatus. For example, an index zone ID of a zone in which the first terminal apparatus is located is Zone 5. When a value of the bit information is "000", it indicates that a terminal apparatus on an east side of Zone 5 needs to feed back the auxiliary resource information.

Optionally, the second terminal apparatus may determine, based on the range indication information and a communication distance of the first terminal apparatus, the geographical range in which the terminal apparatus that needs to feed back the auxiliary resource information is located. The communication distance of the first terminal apparatus indicates a communication range of the first terminal apparatus, for example, a communication coverage radius R of the first terminal apparatus. A geographical zone may be determined by using the range indication information and the communication distance, and a terminal apparatus in the zone needs to feed back the auxiliary resource information to the first terminal apparatus. Optionally, whether the terminal device in the feedback zone actually feeds back the auxiliary resource information to the first terminal apparatus may alternatively depend on another factor, for example, whether the terminal device has a capability of providing the auxiliary resource information.

In an optional implementation, the range indication information is related to a priority of to-be-sent data of the first terminal apparatus and/or a current channel congestion degree.

A priority of sent data is a priority carried in SCI, and the priority indicates a priority of currently sent data. A higher priority of the to-be-sent data indicates a larger value of the range indication information. A high priority indicates that the data is important, and a large value of the range indication information indicates that a finally determined feedback zone is large. For example, for sending of important data, more terminal apparatuses may be scheduled to feed back the auxiliary resource information, to ensure that a resource determining process of the important data has a high priority. On another aspect, if the current channel congestion degree is high, for example, a value that is measured by the first terminal apparatus and that is of a sidelink busy ratio (, SL CBR) or a sidelink channel occupancy ratio (SL CR) is greater than a threshold, a value of a parameter is small, so that fewer UEs are triggered to feed back auxiliary information, to reduce aggravation of channel congestion.

In an optional implementation, that the second terminal apparatus determines, based on the first information, whether the second terminal apparatus is capable of providing auxiliary resource information for a first terminal apparatus includes: The second terminal apparatus determines, based on the range indication information or the direction indication information, that the second terminal apparatus is in a feedback range of the auxiliary resource information of the first terminal apparatus, and the second terminal apparatus determines that the second terminal apparatus is capable of providing the auxiliary resource information for the first terminal apparatus. Alternatively, the second terminal apparatus determines, based on the range indication information or the direction indication information, that the second terminal apparatus is not in a feedback range of the auxiliary resource information of the first terminal apparatus, and the second terminal apparatus determines that the second terminal apparatus is incapable of providing the auxiliary resource information for the first terminal apparatus. A quantity of terminal apparatuses and an amount of the auxiliary resource information are reduced by using a geographical location indication, so that system overheads are reduced, and resource utilization is improved.

In an optional implementation, the second terminal apparatus belongs to a second terminal apparatus group, and the second terminal apparatus group is determined by a higher layer or the first terminal apparatus.

In an optional implementation, the second terminal apparatus receives the first information from the first terminal apparatus, where the first information is for requesting the auxiliary resource information. Alternatively, the second terminal apparatus receives the first information from a network apparatus.

In an optional implementation, the auxiliary resource information includes at least one of the following: a sending resource that the first terminal apparatus tends to use, a sending resource that the first terminal apparatus does not tend to use, a sending resource that conflicts with a sending resource of another terminal apparatus, or an indication indicating that there is a sending resource conflict.

In an optional implementation, the determining, based on the first information, that the second terminal apparatus is incapable of providing the auxiliary resource information for the first terminal device includes: determining, based on the first information, that the second terminal apparatus is not in a feedback range of the auxiliary resource information of the first terminal device, and determining that the second terminal apparatus is incapable of providing the auxiliary resource information for the first terminal device; or determining, based on that a channel status is busy, that valid auxiliary resource information cannot be obtained, or that the second terminal apparatus does not have a capability of providing the auxiliary resource information, that the second terminal apparatus is incapable of providing the auxiliary resource information for the first terminal device.

In an optional implementation, the second indication information is carried on a physical sidelink feedback channel PSFCH, a physical sidelink control channel PSCCH, or a physical sidelink data channel PSSCH.

According to a second aspect, this application provides an indication information receiving method, including: A first terminal apparatus sends first information to at least one second terminal apparatus, where the first information includes range indication information or direction indication information, and the first information is used by the at least one second terminal apparatus to determine whether the at least one second terminal apparatus is capable of providing auxiliary resource information for the first terminal apparatus. The first terminal apparatus receives first indication information or second indication information from the second terminal apparatus. The first indication information includes the auxiliary resource information, and the auxiliary resource information is used by the first terminal apparatus to determine a sending resource. The second indication information indicates that the second terminal apparatus is incapable of providing the auxiliary resource information for the first terminal apparatus.

The method may be performed by a communication device or a communication apparatus that can support a communication device in implementing a function required by the method, for example, a chip. For example, the first terminal apparatus performing the foregoing method may be a terminal device, a chip that is disposed in a terminal device and that is configured to implement a function of the terminal device, or another component that is configured to implement the function of the terminal device.

In an optional implementation, the range indication information indicates a geographical range in which a terminal apparatus that needs to feed back the auxiliary resource information is located; or the direction indication information indicates a geographical orientation, relative to the first terminal apparatus, of a terminal apparatus that needs to feed back the auxiliary resource information. A geographical location of the terminal apparatus that needs to be fed back may be determined by using the range indication information or the direction indication information carried in the first information. For example, the direction indication information may be bit information, and the corresponding geographical orientation is determined by using the bit information. The geographical range is relative to the first terminal apparatus. For example, an index zone ID of a zone in which the first terminal apparatus is located is Zone 5. When a value of the bit information is "000", it indicates that a terminal apparatus on an east side of Zone 5 needs to feed back the auxiliary resource information.

Optionally, the second terminal apparatus may determine, based on the range indication information and a communication distance of the first terminal apparatus, the geographical range in which the terminal apparatus that needs to feed back the auxiliary resource information is located. The communication distance of the first terminal apparatus indicates a communication range of the first terminal apparatus, for example, a communication coverage radius R of the first terminal apparatus. A geographical zone may be determined by using the range indication information and the communication distance, and a terminal apparatus in the zone needs to feed back the auxiliary resource information to the first terminal apparatus. Optionally, whether the terminal device in the feedback zone actually feeds back the auxiliary resource information to the first terminal apparatus may alternatively depend on another factor, for example, whether the terminal device has a capability of providing the auxiliary resource information.

In an optional implementation, the range indication information is related to a priority of to-be-sent data of the first terminal apparatus and/or a current channel congestion degree.

A priority of sent data is a priority carried in SCI, and the priority indicates a priority of currently sent data. A higher priority of the to-be-sent data indicates a larger value of the range indication information. A high priority indicates that the data is important, and a large value of the range indication information indicates that a finally determined feedback zone is large. For example, for sending of important data, more terminal apparatuses may be scheduled to feed back the auxiliary resource information, to ensure that a resource determining process of the important data has a high priority. On another aspect, if the current channel congestion degree is high, for example, a value that is measured by the first terminal apparatus and that is of a sidelink busy ratio SL CBR or a sidelink channel occupancy ratio SL CR is greater than a threshold, a value of a parameter is small, so that fewer UEs are triggered to feed back auxiliary information, to reduce aggravation of channel congestion.

In an optional implementation, the first information is used by the at least one second terminal apparatus to determine whether the at least one second terminal apparatus is in a feedback range of the auxiliary resource information of the first terminal apparatus.

In an optional implementation, the at least one second terminal apparatus belongs to a second terminal apparatus group, and the second terminal apparatus group is determined by a higher layer or the first terminal apparatus.

In an optional implementation, the auxiliary resource information includes at least one of the following: a sending resource that the first terminal apparatus tends to use, a sending resource that the first terminal apparatus does not tend to use, a sending resource that conflicts with a sending resource of another terminal apparatus, or an indication indicating that there is a sending resource conflict.

In an optional implementation, the second indication information is carried on a physical sidelink feedback channel PSFCH, a physical sidelink control channel PSCCH, or a physical sidelink data channel PSSCH.

According to a third aspect, a communication apparatus is provided. For beneficial effects, refer to descriptions of the first aspect. Details are not described herein again. The apparatus may be the terminal apparatus, may be a chip or a module in the terminal apparatus, or may be a chip or a system-on-a-chip. The apparatus includes a transceiver unit, configured to receive first information, where the first information includes range indication information or direction indication information; and a processing unit, configured to determine, based on the first information, whether a second terminal apparatus is capable of providing auxiliary resource information for a first terminal apparatus. The auxiliary resource information is for determining a sending resource of the first terminal apparatus. When the second terminal apparatus is capable of providing the auxiliary resource information for the first terminal apparatus, the transceiver unit is further configured to send first indication information to the first terminal apparatus, where the first indication information includes the auxiliary resource information. Alternatively, when the second terminal apparatus is incapable of providing the auxiliary resource information for the first terminal apparatus, the transceiver unit is further configured to send second indication information to the first terminal apparatus, where the second indication information indicates that the second terminal apparatus is incapable of providing the auxiliary resource information for the first terminal apparatus.

In an optional implementation, the range indication information indicates a geographical range in which a terminal apparatus that needs to feed back the auxiliary resource information is located; or the direction indication information indicates a geographical orientation, relative to the first terminal apparatus, of a terminal apparatus that needs to feed back the auxiliary resource information.

In an optional implementation, the range indication information is related to a priority of to-be-sent data of the first terminal apparatus and/or a current channel congestion degree.

In an optional implementation, the processing unit is further configured to determine, based on the range indication information or the direction indication information, that the second terminal apparatus is in a feedback range of the auxiliary resource information of the first terminal apparatus, and determine that the second terminal apparatus is capable of providing the auxiliary resource information for the first terminal apparatus. Alternatively, the processing unit is further configured to determine, based on the range indication information or the direction indication information, that the second terminal apparatus is not in a feedback range of the auxiliary resource information of the first terminal apparatus, and determine that the second terminal apparatus is incapable of providing the auxiliary resource information for the first terminal apparatus.

In an optional implementation, the transceiver unit is further configured to receive the first information from the first terminal apparatus, where the first information is for requesting the auxiliary resource information. Alternatively, the transceiver unit is further configured to receive the first information from a network apparatus.

In an optional implementation, the auxiliary resource information includes at least one of the following: a sending resource that the first terminal apparatus tends to use, a sending resource that the first terminal apparatus does not tend to use, a sending resource that conflicts with a sending resource of another terminal apparatus, or an indication indicating that there is a sending resource conflict.

According to a fourth aspect, a communication apparatus is provided. For beneficial effects, refer to descriptions of the second aspect. Details are not described herein again. The apparatus may be the terminal device, may be a chip or a module in the terminal device, or may be a chip or a system-on-a-chip. The apparatus includes a transceiver unit, configured to send first information to at least one second terminal apparatus. The first information includes range indication information or direction indication information, and the first information is used by the at least one second terminal apparatus to determine whether the at least one second terminal apparatus is capable of providing auxiliary resource information for the first terminal apparatus. The transceiver unit is configured to receive first indication information or second indication information from the second terminal apparatus. The first indication information includes the auxiliary resource information, and the auxiliary resource information is for determining a sending resource. The second indication information indicates that the second terminal apparatus is incapable of providing the auxiliary resource information for the first terminal apparatus.

In an optional implementation, the range indication information indicates a geographical range in which a terminal apparatus that needs to feed back the auxiliary resource information is located; or the direction indication information indicates a geographical orientation, relative to the first terminal apparatus, of a terminal apparatus that needs to feed back the auxiliary resource information.

In an optional implementation, the range indication information is related to a priority of to-be-sent data of the first terminal apparatus and/or a current channel congestion degree.

In an optional implementation, the first information is used by the at least one second terminal apparatus to determine whether the at least one second terminal apparatus is in a feedback range of the auxiliary resource information of the first terminal apparatus.

In an optional implementation, the at least one second terminal apparatus belongs to a second terminal apparatus group, and the second terminal apparatus group is determined by a higher layer or a processing unit.

In an optional implementation, the auxiliary resource information includes at least one of the following: a sending resource that the first terminal apparatus tends to use, a sending resource that the first terminal apparatus does not tend to use, a sending resource that conflicts with a sending resource of another terminal apparatus, or an indication indicating that there is a sending resource conflict.

According to a fifth aspect, this application provides an auxiliary information receiving method, including: A first terminal apparatus sends second information to a second terminal apparatus group, where the second information indicates a terminal device in the second terminal apparatus group that needs to feed back auxiliary resource information. The first terminal apparatus receives the auxiliary resource information from the terminal device that needs to feed back the auxiliary resource information. The first terminal apparatus determines a sending resource based on the auxiliary resource information.

According to the method, the first terminal apparatus may select a specific UE to feed back auxiliary information, so that the first terminal controls an amount of the auxiliary resource information, to reduce overheads of an entire system.

In an optional implementation, the second information includes trigger information, and the trigger information indicates that a terminal device that has fed back a NACK in the second terminal group is the terminal device that feeds back the auxiliary resource information. Alternatively, the second information includes a bitmap, and the bitmap indicates the terminal device that needs to feed back the auxiliary resource information in the second terminal apparatus group. Each bit of the bitmap corresponds to one second terminal in the second terminal apparatus group. Second terminals in the second terminal apparatus group are sorted in a specific order, for example, in ascending order of group member identifiers. A most significant bit (MSB) of the bitmap corresponds to a second terminal apparatus with a smallest group member identifier in the second terminal apparatus group, where the group member identifier is determined by a higher layer or the second terminal apparatus. When a bit value is "1", a corresponding second terminal apparatus needs to feed back the auxiliary resource information. When a bit value is "0", a corresponding second terminal apparatus does not feed back the auxiliary resource information.

In an optional implementation, the trigger information indicates a terminal device that feeds back a NACK or a terminal device that feeds back a NACK for more than N1 times during initial transmission and retransmission in a same data block TB. N1 is a positive integer.

According to a sixth aspect, this application provides an auxiliary information feedback method, including: A second terminal apparatus receives second information from a first terminal device, where the second information indicates a terminal device in a second terminal apparatus group that needs to feed back auxiliary resource information. The second terminal apparatus determines, based on the second information, the terminal device that needs to feed back the auxiliary resource information, and sends the auxiliary resource information to the first terminal device, where the auxiliary resource information is for determining a sending resource of the first terminal device. Alternatively, the second terminal apparatus determines, based on the second information, the second terminal apparatus is not the terminal device that needs to feed back the auxiliary resource information.

In an optional implementation, the determining, based on the second information, the terminal device that needs to feed back the auxiliary resource information includes: when the second information includes trigger information, and the trigger information indicates that a terminal device that has fed back a NACK in the second terminal group is the terminal device that needs to feed back the auxiliary resource information, determining, based on the trigger information, the terminal device that needs to feed back the auxiliary resource information; or when the second information includes a bitmap, and the bitmap indicates the terminal device that needs to feed back the auxiliary resource information in the second terminal apparatus group, determining, based on the bitmap, the terminal device that needs to feed back the auxiliary resource information.

In an optional implementation, the trigger information indicates a terminal device that feeds back a NACK or a terminal device that feeds back a NACK for more than N1 times during initial transmission and retransmission in a same data block TB. N1 is a positive integer.

According to a seventh aspect, an embodiment of this application provides a computer-readable storage medium or a non-volatile storage medium. The computer-readable storage medium or the non-volatile storage medium stores instructions or a program. When the instructions or the program is run on a computer, the computer is enabled to perform the methods in the foregoing aspects, or when the instructions or the program is run on one or more processors, a communication apparatus including the one or more processors is enabled to perform the methods in the foregoing aspects.

According to an eighth aspect, an embodiment of this application provides a computer program product. The computer program product is configured to store a computer program, and when the computer program is run on a computer, the computer is enabled to perform the method in any one of the foregoing aspects.

According to a ninth aspect, an embodiment of this application provides a chip or an indication information transmission apparatus, including at least one processor. The at least one processor is coupled to a memory, the memory includes instructions, and the at least one processor runs the instructions to enable the apparatus for transmitting a public signal to perform the method in the first aspect, the second aspect, the fifth aspect, or the sixth aspect.

According to a tenth aspect, a communication apparatus is provided. The communication apparatus includes one or more processors, and one or more memories or non-volatile storage media. The one or more memories or non-volatile storage media store instructions or a program. When the one or more processors execute the instructions or the program, the communication apparatus or the one or more processors are enabled to perform the methods in the foregoing aspects and embodiments of this application.

According to an eleventh aspect, a terminal apparatus or a communication apparatus is provided, and is configured to perform the method in the second aspect or the sixth aspect.

According to a twelfth aspect, a network apparatus or a communication apparatus is provided, and is configured to perform the method in the first aspect or the fifth aspect.

According to a thirteenth aspect, an embodiment of this application provides a system. The system includes the apparatus in the third aspect and the apparatus in the fourth aspect.

DESCRIPTION OF EMBODIMENTS

The following further describes in detail embodiments of this application with reference to accompanying drawings.

Figures 1, 2:
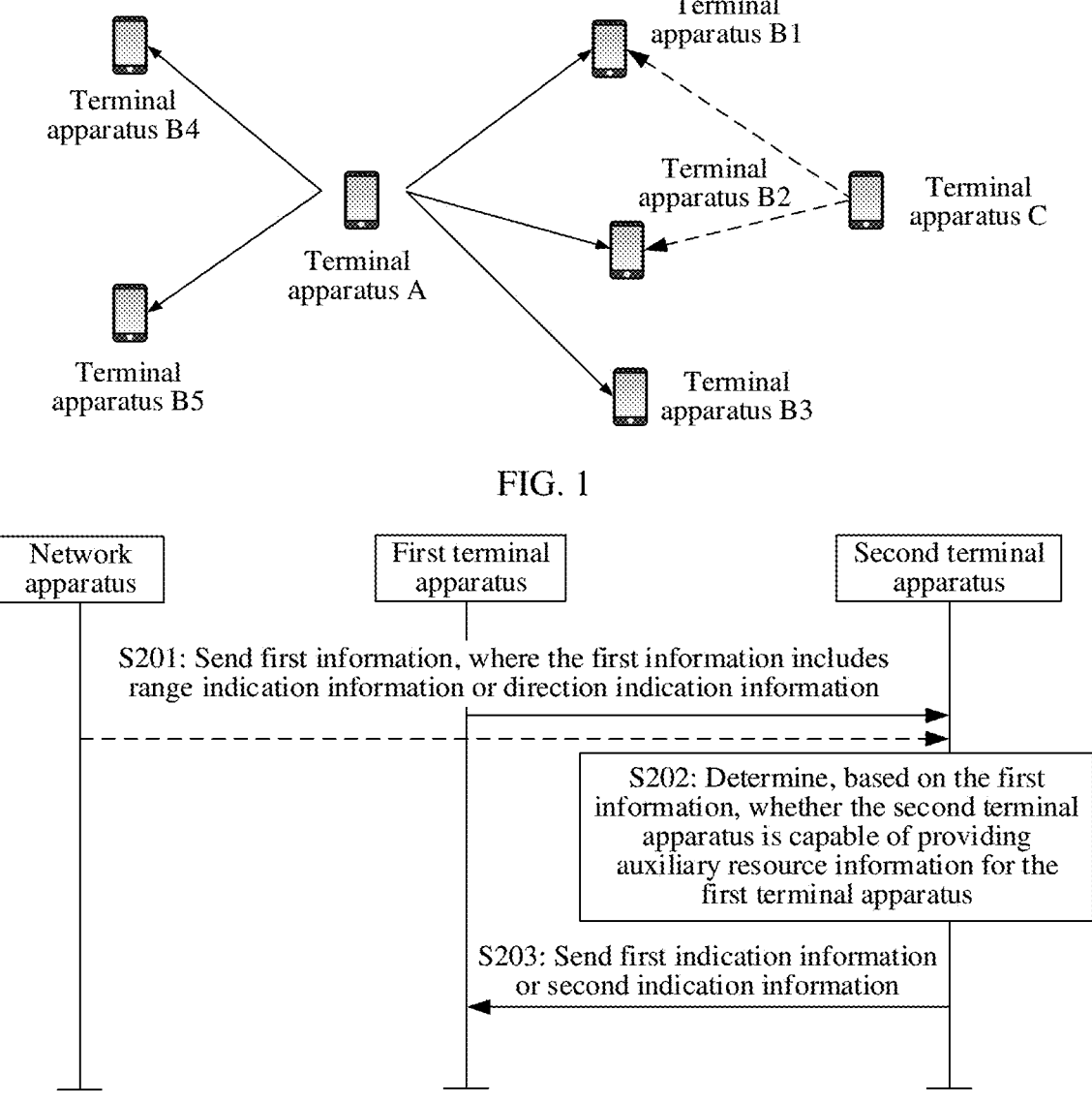
FIG. 1 is a schematic diagram of a network architecture applicable to embodiments of this application.
FIG. 2 is a schematic flowchart of a method according to an embodiment of this application.

FIG. 1 is a schematic diagram of a possible application scenario according to an embodiment of this application. In FIG. 1, a terminal apparatus A performs side communication with terminal apparatuses B1 to B5, and a terminal apparatus C may also perform side communication with B1 and B2. The terminal apparatuses B1 to B5 may form a terminal apparatus group. The terminal apparatus in the terminal apparatus group may perform unicast communication with the terminal apparatus A or the terminal apparatus B. The terminal apparatuses in FIG. 1 may communicate with each other in a broadcast manner, for example, may receive a broadcast message from the terminal apparatus A. Optionally, the terminal apparatuses B1 to B5 and A may alternatively be in a terminal apparatus group. In this case, multicast communication may be performed among the terminal apparatuses B1 to B5 and A.

The following describes some terms in embodiments of this application, to facilitate understanding of a person skilled in the art.

(1) Terminal apparatus: A first terminal apparatus or a second terminal apparatus in this application may include various devices having a wireless communication function or units, components, modules, apparatuses, chips, or SOCs in the devices. The device having the wireless communication function may be, for example, a vehicle-mounted device, a wearable device, a computing device or another device connected to a wireless modem, a mobile station (MS), a terminal, or user equipment (UE). When the first terminal apparatus and the second terminal apparatus are vehicle-mounted devices, the first terminal apparatus and the second terminal apparatus may be disposed or installed in a vehicle. The vehicle-mounted device may be considered as a part of the vehicle, or may be considered as a module or a module disposed in the vehicle. The vehicle-mounted terminal apparatus may also be referred to as an on board unit (OBU).

The first terminal apparatus or the second terminal apparatus in embodiments of this application may further include a device that provides a voice and/or data connectivity for a user. In some embodiments, the first terminal apparatus or the second terminal apparatus includes a device that provides the voice for the user, includes a device that provides the data connectivity for the user, or includes a device that provides the voice and the data connectivity for the user. For example, the first terminal apparatus or the second terminal apparatus may include a handheld device having a wireless connection function, or a processing device connected to a wireless modem. The terminal device may communicate with a core network via a radio access network (RAN), and exchange voice or data with the RAN, or exchange voice and data with the RAN. The terminal apparatus may include user equipment (UE), a wireless terminal device, a mobile terminal device, a device-to-device (D2D) communication terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal apparatus may include a mobile phone (which is also referred to as a "cellular" phone), a computer with a mobile terminal device, or a portable, pocket-sized, handheld, or computer built-in mobile apparatus, for example, a device such as a personal communication service (PCS) phone, a cordless telephone set, a session initiation protocol (SIP) phone, a wireless local loop (WLL) station, or a personal digital assistant (PDA). The terminal apparatus may alternatively include a limited device, for example, a device with low power consumption, a device with a limited storage capability, or a device with a limited computing capability.

For example, the terminal apparatus includes an information sensing device such as a barcode, radio frequency identification (RFID), a sensor, a global positioning system (GPS), or a laser scanner.

By way of example but not limitation, the first terminal apparatus or the second terminal apparatus in embodiments of this application may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

The terminal apparatus may be a terminal device, or may be a module configured to implement a function of the terminal device. The module may be disposed in the terminal device, or may be disposed independently of the terminal device. For example, the module is a chip, a chip system, or a system-on-a-chip.

(2) A network apparatus includes, for example, an access network (AN) device such as a base station (for example, an access point), and may be a device that communicates with a wireless terminal device through an air interface by using one or more cells in an access network. Alternatively, for example, a network device in a vehicle-to-everything (V2X) technology is a road side unit (RSU). The base station may be configured to perform mutual conversion between a received over-the-air frame and an IP packet, and serve as a router between the terminal device and a remaining part of the access network. A remaining part of the access network may include an IP network. The RSU may be a fixed infrastructure entity supporting a V2X application, and may exchange a message with another entity supporting the V2X application. The network device may further coordinate attribute management of the air interface. For example, the network apparatus may include an evolved NodeB (NodeB or eNB or eNodeB, evolved NodeB) in a long term evolution (LTE) system or a long term evolution-advanced (LTE-A) system, may include a next generation NodeB (gNB) in a 5$^{th}$ generation (5G) new radio (NR) system (which is also briefly referred to as an NR system), or may include a central unit (CU) and a distributed unit (DU) in a cloud access network (C-RAN) system. This is not limited in embodiments of this application.

(3) V2X communication in embodiments of this application is interconnection between a vehicle and the outside, and is a basis and a key technology of a future intelligent vehicle, autonomous driving, and an intelligent transportation system. In the V2X, a specific V2X application requirement is to be optimized based on an existing device-to-device (D2D) technology, to further reduce an access delay of a V2X device and resolve a resource conflict problem.

In some embodiments, the V2X further includes several application requirements such as vehicle-to-vehicle (V2V), vehicle-to-infrastructure (V2I), and vehicle-to-pedestrian (, V2P) direct communication, and vehicle-to-network (V2N) communication interaction. Details are shown in FIG. 1. V2V refers to communication between vehicles, V2P refers to communication between a vehicle and a person (including a pedestrian, a bicycle rider, a driver, or a passenger), and V2I refers to communication between a vehicle and a network device such as an RSU. In addition, V2N may be included in V2I. V2N refers to communication between a vehicle and a base station/a network.

V2P may be for safety warning for a pedestrian or a non-motor vehicle on a road. A vehicle may communicate, through V2I, with a road or even another infrastructure such as a traffic light or a road barrier, to obtain road management information such as a traffic light signal time sequence. V2V may be used for information exchange and reminding between vehicles, and a most typical application is an anti-collision safety system between vehicles. V2N is a most widely used form of an internet of vehicles currently, and a main function of V2N is to enable a vehicle to connect to a cloud server through a mobile network, to use an application function, for example, navigation, entertainment, or anti-theft, provided by the cloud server.

In V2X, communication is mainly performed between terminal devices. For a mode of transmission between the terminal devices, a current standard protocol supports a broadcast manner, a multicast manner, and a unicast manner.

Broadcast manner: The broadcast manner means that a terminal device serving as a transmit end sends data in a broadcast mode, and a plurality of terminal devices can all receive sidelink control information (SCI) or a sidelink shared channel (SSCH) from the transmit end.

On a sidelink, a manner of ensuring that all terminal devices parse the control information from the transmit end is that the transmit end does not scramble the control information or that the transmit end scrambles the control information by using a scrambling code known to all the terminal devices.

Multicast manner: The multicast manner is similar to the broadcast manner. The terminal device serving as the transmit end sends data in the broadcast mode. A group of terminal devices can all parse the SCI or the SSCH.

Unicast manner: In the unicast manner, one terminal device sends data to the other terminal device, and another terminal device does not need to or cannot parse the data.

(4) Sidelink: The sidelink is a link between terminal apparatuses. An uplink is a link over which the terminal apparatus sends information to the network apparatus, and a downlink is a link over which the terminal apparatus receives information from the network apparatus.

(5) Terms "system" and "network" may be used interchangeably in embodiments of this application. "At least one" means one or more, and "a plurality of" means two or more. "And/Or" is an association relationship for describing associated objects, and represents that three relationships may exist. For example, A and/or B may represent the following cases: Only A exists, both A and B exist, and only B exists, where A and B may be in a singular form or a plural form. The character "/" generally indicates an "or" relationship between the associated objects. At least one of the following items or a similar expression thereof refers to any combination of these items, including any combination of singular items or plural items. For example, at least one of a, b, or c may indicate: a, b, c, a-b, a-c, b-c, or a-b-c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first power control factor and a second power control factor are merely used to distinguish between different power control factors, and do not necessarily indicate different content, priorities, importance degrees, or the like of the two power control factors.

An indication information transmission method, an apparatus, and a system in embodiments of this application may be applied to a direct communication field such as V2X, an internet of vehicle, an internet connected vehicle, an intelligent connected vehicle, intelligent driving, assisted driving, or device-to-device communication.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems. A communication manner is not limited in embodiments or the method provided in this application, and may be a unicast manner, a multicast manner, or a broadcast manner.

Refer the foregoing descriptions. FIG. 2 is a schematic flowchart of a communication method according to an embodiment of this application. Refer to FIG. 2. The method includes the following steps.

Step 201: A second terminal apparatus receives first information. The first information includes range indication information and/or direction indication information.

The first information may come from a first terminal apparatus. In this case, the first information is for requesting auxiliary resource information. The first terminal apparatus may send the first information to at least one second terminal apparatus. Optionally, the at least one second terminal apparatus may belong to a second terminal apparatus group, and the second terminal apparatus belongs to the second apparatus group. The group may be determined by a higher layer. The first terminal apparatus knows terminal apparatuses included in the group. For example, in a multicast feedback feedback manner 2, a size of the group and a group member are determined by the higher layer. For the multicast feedback manner 2, a receiving terminal apparatus needs to feed back information about a hybrid automatic retransmission HARQ positive answer ACK and a negative answer NACK. In another manner, the group may be a group that is determined by the first terminal apparatus and that is for triggering the second terminal apparatus to feed back the auxiliary resource information. Optionally, the group determined by the first terminal apparatus may be a subset of a set of selected by a higher layer group. Optionally, both the first terminal apparatus and the second terminal apparatus belong to the second apparatus group.

Alternatively, the first information may come from a network apparatus. In this case, the first information sent by the network apparatus to the second terminal apparatus may be understood as configuration information. After receiving the configuration information, the terminal apparatus may determine, based on content in the configuration information, whether the terminal apparatus is capable of providing the auxiliary resource information for the first terminal apparatus. If a related condition is satisfied, the auxiliary resource information may be further provided for the first terminal apparatus. The configuration information may carry a related geographical location parameter that is used by the second terminal apparatus to determine whether to provide resource assistance for the first terminal apparatus. The network apparatus sends the first information to the second terminal apparatus, or the range indication information or the direction indication information is preconfigured, so that signaling overheads of the first terminal apparatus can be reduced.

Step 202: The second terminal apparatus determines, based on the first information, whether the second terminal apparatus is capable of providing the auxiliary resource information for the first terminal apparatus, where the auxiliary resource information is for determining a sending resource of the first terminal apparatus.

Step 203: When the second terminal apparatus is capable of providing the auxiliary resource information for the first terminal apparatus, the second terminal apparatus sends first indication information to the first terminal apparatus, and the first terminal apparatus receives the first indication information from the second terminal apparatus, where the first indication information includes the auxiliary resource information; or when the second terminal apparatus is incapable of providing the auxiliary resource information for the first terminal apparatus, the second terminal apparatus sends second indication information to the first terminal apparatus, and the first terminal apparatus receives the second indication information from the second terminal apparatus, where the second indication information indicates that the second terminal apparatus is incapable of providing the auxiliary resource information for the first terminal apparatus. Optionally, the auxiliary resource information may be sent on a physical sidelink feedback channel PSFCH by using a physical sidelink shared channel (PSSCH), or on a physical sidelink control channel PSCCH. Optionally, the first indication information is the auxiliary resource information.

The auxiliary resource information is for helping the first terminal apparatus, namely, a data sending terminal, determine an appropriate sending resource. The auxiliary resource information includes at least one of the following: a sending resource that the first terminal apparatus tends to use, a sending resource that the first terminal apparatus does not tend to use, a sending resource that conflicts with a sending resource of another terminal apparatus, or an indication indicating that there is a sending resource conflict. The auxiliary resource information is used by the first terminal apparatus, namely, a terminal apparatus that is to send data, to determine the sending resource, for example, determine a sidelink sending resource of multicast information, broadcast information, or unicast information. For example, in a case of unicast and multicast, a sending terminal apparatus may directly select a receiving terminal as an auxiliary terminal apparatus, namely, auxiliary UE. The receiving terminal directly feeds back a related resource, so that the sending terminal selects a resource. For multicast, the auxiliary UE may be one or more of receiving terminal apparatuses that need to receive multicast data. The auxiliary terminal apparatus may not be a receiving apparatus. This is not limited.

The resource that conflicts with the sending resource of the another terminal apparatus may be a resource that conflicts with the sending resource of the another terminal apparatus and that is in past sending resources, or a resource that is sensed by the second terminal and that conflicts with the sending resource of the another terminal apparatus in the future. The auxiliary resource information may alternatively be a conflict indication, indicating that the sending resource of the first terminal apparatus conflicts with the sending resource of the another terminal apparatus in the past or in the future.

Optionally, in step 202, that the second terminal apparatus determines, based on the first information, whether the second terminal apparatus is capable of providing the auxiliary resource information for the first terminal apparatus includes: The second terminal apparatus determines, based on the first information, whether the second terminal apparatus is in a feedback range of the auxiliary resource information of the first terminal apparatus. When the second terminal apparatus determines that the second terminal apparatus is in the feedback range, the second terminal apparatus is capable of providing the auxiliary resource information for the first terminal apparatus. Alternatively, it is determined, based on that the second terminal apparatus is in the feedback range, that a precondition of sending the auxiliary resource information to the first terminal apparatus is satisfied. In this precondition, whether the auxiliary resource information is sent to the first terminal apparatus may further depend on another factor, for example, whether the second terminal apparatus obtains valid auxiliary resource information. When the second terminal apparatus determines that the second terminal apparatus is not in the feedback range, the second terminal apparatus is incapable of providing the auxiliary resource information for the first terminal apparatus. The first information indicates related geographical information of the first terminal apparatus. A corresponding geographical zone may be determined based on the first information, and a terminal apparatus in the zone is suitable for providing resource assistance to the first terminal apparatus.

It should be noted that, in addition to whether the second terminal apparatus is in the feedback range of the first terminal apparatus, another condition may also need to be concerned for whether the second terminal apparatus actually provides the auxiliary resource information for the first terminal apparatus, for example, a current channel status, whether the second terminal apparatus can obtain a valid sensing result, and/or whether the second terminal apparatus has a capability of providing the auxiliary resource information.

That the second terminal apparatus determines, based on the first information, that the second terminal apparatus is incapable of providing the auxiliary resource information for the first terminal apparatus includes: determining, based on the first information, that the second terminal apparatus is not in the feedback range of the auxiliary resource information of the first terminal apparatus, and determining that the second terminal apparatus is incapable of providing the auxiliary resource information for the first terminal device; or determining, based on that a channel status is busy, that valid auxiliary resource information cannot be obtained, or that the second terminal apparatus does not have a capability of providing the auxiliary resource information, that the second terminal apparatus is incapable of providing the auxiliary resource information for the first terminal device. That the channel status is busy, that the valid auxiliary resource information cannot be obtained, and/or that the second terminal apparatus does not have the capability of providing the auxiliary resource information are separately described below.

A. The channel status is busy.

If the current channel status is excessively busy, for example, a measured value of a channel busy ratio (CBR) of the second terminal apparatus is greater than a threshold, the second terminal apparatus does not feed back the auxiliary resource information. It should be noted that a value of the CBR threshold and a CBR threshold for determining whether the first terminal apparatus triggers an auxiliary resource information request may be a same threshold.

B. The valid auxiliary resource information or the valid sensing result cannot be obtained.

(1) The second terminal apparatus switches a resource pool.

(2) The second terminal apparatus cannot perform sensing sensing, for example, performs resource selection in a random selection manner.

(3) The second terminal apparatus uses partial sensing, but sensing time is excessively short.

(4) A proportion of selected candidate resources to total resources does not exceed a proportion, for example, X %.

In the cases (1) to (4), it is considered that the second terminal apparatus cannot obtain the valid sensing result. In this case, the second terminal apparatus may not send the auxiliary resource information to the first terminal apparatus, even if the second terminal apparatus receives resource assistance request information and is in the feedback range. Sensing is a process of determining an RSRP threshold based on a priority of received data and a priority of to-be-sent data that are carried in received sidelink control information (SCI), and determining whether an RSRP of the received SCI or data is greater than the threshold and whether a resource of the received SCI in a current time period and a future slot that is determined based on a received periodicity overlaps a resource of the to-be-sent data in the current slot or the future slot, to determine whether a candidate resource in the slot is applicable to a data sending process. That the valid sensing result cannot be obtained means that a resource for sending cannot be determined in a resource selection window by using a resource sensing result in the resource sensing window.

C. The second terminal apparatus does not have the capability of providing the auxiliary information.

When the second terminal apparatus is in consideration of energy saving, the second terminal apparatus does not support resource assistance. In this case, the second terminal apparatus may ignore the resource assistance request information, even if the second terminal apparatus receives a resource assistance request from the first terminal device or the first information from the network apparatus, and the second terminal apparatus is in the feedback range.

It is determined, based on the foregoing conditions, that the second terminal apparatus may determine, based on an actual capability condition of the second terminal apparatus, whether to feed back the auxiliary resource information to the first terminal apparatus. The second terminal apparatus provides the auxiliary resource information for the first terminal apparatus only when the second terminal apparatus has the valid sensing result and satisfies a channel condition. A range of feedback terminals may be narrowed by using further conditional filtering, so that effectiveness and reliability of resource feedback can be improved.

The first information includes the range indication information or the direction indication information. When a transmitting end of the first information is the first terminal apparatus, the first information is an auxiliary resource request message.

The range indication information indicates a geographical range in which a terminal apparatus that needs to feed back the auxiliary resource information is located. The direction indication information indicates a geographical orientation, relative to the first terminal apparatus, of a terminal apparatus that needs to feed back the auxiliary resource information.

Optionally, the second terminal apparatus may determine, based on the range indication information and a communication distance of the first terminal apparatus, the geographical range in which the terminal apparatus that needs to feed back the auxiliary resource information is located. The communication distance of the first terminal apparatus indicates a communication range (CR) of the first terminal apparatus, where the range indication information may be $R_M$. A geographical zone may be determined by using the range indication information and the communication distance, and a terminal apparatus in the zone needs to feed back the auxiliary resource information to the first terminal apparatus.

Figure 3:
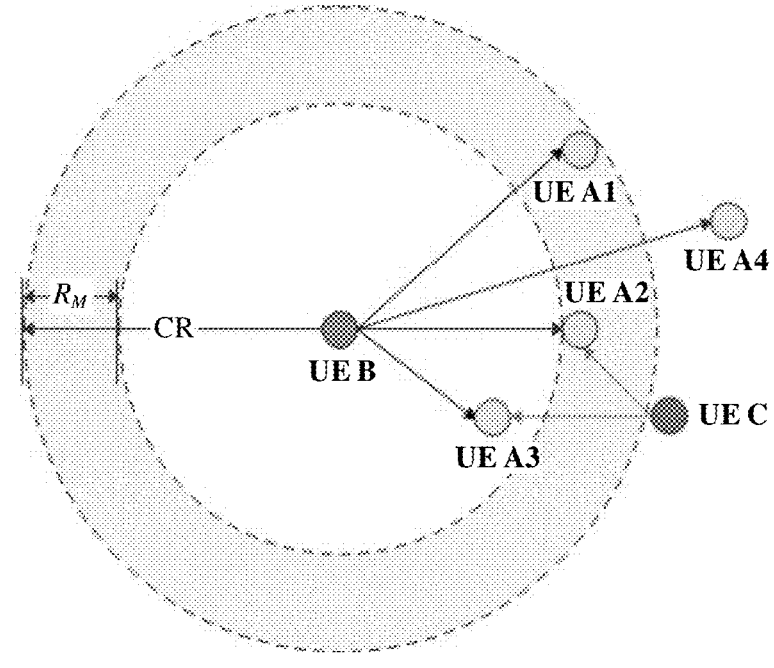
FIG. 3 is a schematic geographical diagram of an auxiliary resource feedback according to an embodiment of this application.

FIG. 3 is used as an example for description below. The first terminal apparatus is represented by UE B, the second terminal apparatus may be represented by UE A, and UE C may be understood as another terminal apparatus, and has a communication relationship with a part of the UE A. FIG. 3 shows a plurality of UEs A. It may be considered that the UE B and UE A1 to UE A4 are in one terminal apparatus group, for example, a second terminal apparatus group. The first terminal apparatus or the network apparatus sends the first information to at least one second terminal apparatus, for example, may send the first information to the UE A1 to the UE A4. The first information carries the range indication information $R_M$, where $R_M$ may be represented as a width of a ring zone determined in FIG. 3. The UE A1 to the UE A4 that receive the first information determine, based on $R_M$ carried in the first information, whether the UE A1 to the UE A4 are in a feedback range of the UE B. The feedback range may be represented by $[CR–R_M, CR]$. CR is the communication range of the first terminal apparatus. Optionally, CR may alternatively be carried in the first information, and further, may be carried in the range indication information together with $R_M$. The UE A1 to the UE A4 determine, based on $R_M$ and CR, whether the UE A1 to the UE A4 are in the feedback range. As shown in FIG. 3, the feedback range is a ring in a geographical zone. The UE A1 and the UE A2 are in the feedback range, and the UE A3 and the UE A4 are outside the feedback range. Therefore, the UE A3 and the UE A4 do not need to feed back the auxiliary resource information to the UE B. Whether the UE A1 and the UE A2 feed back the auxiliary resource information to the UE B may further depend on the foregoing factor such as whether the channel is busy or whether the valid sensing result can be obtained. Certainly, subsequent determining may alternatively not be performed. In some embodiments, after determining that the UE A1 and the UE A2 belong to the feedback feedback of the UE B, the UE A1 and the UE A2 may send the auxiliary resource information to the UE B.

The UE-B and the UE-A1 to the UE-A4 may be in one group, and the group is determined by a higher layer, for example, determined by an application layer application layer. The UE-B knows UEs included in the group. For example, in a multicast feedback manner 2, a size of the group and group members are determined by the higher layer. On another aspect, the group may be a group that is determined by the UE-B and that is for triggering the UE-A to feed back the auxiliary resource information, and the group may be a subset selected by the higher layer group.

Determining of the parameter $R_M$ may be related to a priority of sent data and/or a channel congestion degree. The priority of the sent data is a priority carried in SCI, and priority indicates a priority of currently sent data. When a priority of to-be-sent data of the UE-B is high, greater $R_M$ may be configured, so that more auxiliary UEs help the UE-B perform resource selection. In this way, resource sensing of the UE-B is improved. A higher priority of the to-be-sent data indicates a larger value of the range indication information. A high priority indicates that the data is important, and a large value of the range indication information indicates that a finally determined feedback zone is large. In some embodiments, for sending of important data, more terminal apparatuses may be scheduled to feed back the auxiliary resource information, to ensure that a resource determining process of the important data has a high priority, and improve transmission reliability. On another aspect, if the current channel congestion degree is high, for example, a value that is measured by the UE-B and that is of an SL CBR or an SL CR is greater than a threshold, a value of the parameter $R_M$ is small, so that fewer UEs are triggered to feed back auxiliary information, to reduce aggravation of channel congestion.

Figure 4:
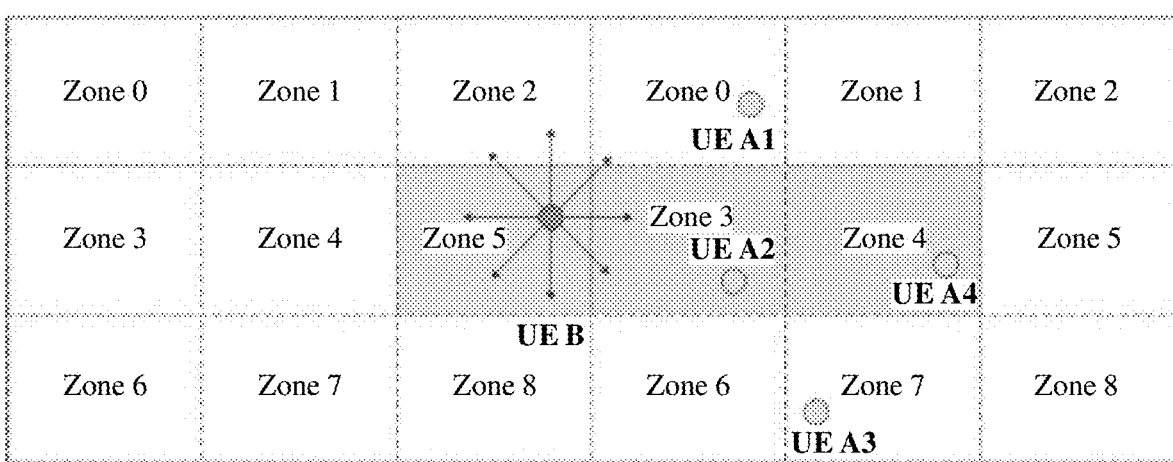
FIG. 4 is a schematic geographical diagram of an auxiliary resource feedback according to an embodiment of this application.

When the first information carries the direction indication information, for a specific manner, refer to FIG. 4.

Similar to FIG. 3, the first terminal apparatus in FIG. 4 may be represented by UE B, and it may be considered that the UE B and UE A1 to UE A4 are in one terminal apparatus group, for example, a second terminal apparatus group. In FIG. 4, geographical locations are divided based on zones zones. For example, the zones may be numbered from a zone 1 to a zone 8, and numbers may be repeated.

The first information carries the direction indication information, and the direction indication information may include a number zone ID of a corresponding zone that satisfies the feedback range. For example, in FIG. 4, the UE B, namely, the first terminal apparatus, is located in a zone 5. Based on a resource sensing requirement, terminal apparatuses whose geographical locations are a zone 3 and a zone 4 need to feed back the auxiliary resource information to the UE B. In this case, the direction indication may carry information indicating the zone 3 and the zone 4 or directly carry numbers of the zone 3 and the zone 4. In addition, to avoid a problem that UEs in a plurality of zones feed back the auxiliary information to the sending UE simultaneously due to repeated zone IDs, and system overheads are consequently increased, the direction indication information may further carry information indicating a direction. A zone ID is determined by using a direction indication. As shown in FIG. 4, the UE-B is located in the zone 5, and sends the resource assistance request information to the UE-A1 to the UE-A4, where the resource request assistance information includes zone ID indication information, indicating the zone 3 and the zone 4. The UE-B may alternatively use three bits to indicate eight directions of a location of the UE-B, where for example, "000" may indicate a direction of due east (which is horizontal to right). It should be noted that, that when the bits are 000, the direction of due east is indicated is merely an example, and a correspondence between a value of the bits and a direction may be flexible and variable. When "000" is carried in the auxiliary resource information, it indicates that only UEs-A in the direction of due east of the zone 5 and whose zone IDs are the zone 3 and the zone 4, namely, UE-A2 and UE-A4 in the figure need to provide resource assistance for the UE-B. After receiving the first information, the UE-A1 to the UE-A4, namely, the second terminal device group, may determine, based on the direction indication information carried in the first information, whether the UE-A1 to the UE-A4 belong to the feedback range of the first terminal apparatus. For example, the UE A1 located in a zone 0 determines, based on information that indicates the zone 3 and the zone 4 and that is carried in the first information, or based on the numbers of the zone 3 and the zone 4 that are carried in the first information, that the UE A1 does not belong to the feedback range. Optionally, second indication information may be sent to the first terminal apparatus, to indicate that the auxiliary resource information cannot be provided. Optionally, a related direction, for example, a direction of due north or a southwest direction, may alternatively be directly indicated in the first information. Feedback range indication efficiency is improved by using the direction indication information.

The second indication information is carried on a physical sidelink feedback channel PSFCH, a physical sidelink control channel PSCCH, or a physical sidelink data channel PSSCH. The second indication information indicates that the second terminal apparatus is incapable of providing the auxiliary resource information for the first terminal apparatus.

The second indication information may be fed back in a plurality of manners.

1. The second indication information is fed back by using a feedback channel PSFCH, and whether the auxiliary information is provided is determined by re-interpreting NACK information.

Optionally, the second indication information includes a negative acknowledgement (NACK). After the second terminal apparatus receives the first information, if the second terminal apparatus determines that the second terminal apparatus is capable of providing the auxiliary resource information for the first terminal apparatus, the second terminal apparatus directly sends the auxiliary resource information to the first terminal apparatus, and does not feed back an acknowledgement message (ACK). If the auxiliary resource information cannot be provided, the second terminal apparatus needs to feed back the NACK to the first terminal apparatus, to indicate that the auxiliary resource information cannot be provided. When the first terminal apparatus does not receive the NACK, it is considered that the auxiliary UE may provide the auxiliary resource information. Therefore, to distinguish whether NACK information carried on the PSFCH is for feeding back a NACK for normal data or a rejection response to request information, an indication field may be carried in the request information, namely, SCI corresponding to the first information. The indication field indicates whether normal HARQ information or acknowledgement information of providing of the auxiliary resource information is fed back on the feedback channel. For example, one bit is used for indication in the SCI. When the indication field is "0", it indicates that the normal HARQ information is fed back. When the indication field is "1", it indicates that a NACK for data in a normal case is not fed back, but acknowledgement information indicating whether the auxiliary resource information can be provided is fed back. The indication field may be carried in a reserved bit in a SCI format 1-A, or may be carried in a new SCI format 2 other than a SCI format 2-A or 2-B.

In a manner, when the indication field indicates the acknowledgement information indicating whether the auxiliary resource information can be provided, that is, when the indication field indicates 1, the second terminal apparatus feeds back only NACK information of one type.

| HARQ information | Indicated meaning |
| --- | --- |
| "0"-NACK | No auxiliary resource information is provided. |

In another manner, NACK information of two types is fed back.

A NACK is normal feedback information for data, and a NACK_RAI is acknowledgement information for the auxiliary resource information. Details are as follows:

| HARQ information | Indicated meaning |
| --- | --- |
| "0"-NACK | A PSSCH is not decoded. |
| "1"-NACK_RAI | No auxiliary resource information is provided. |

Certainly, in this case, it may also be understood that the second manner is re-interpretation of the ACK. In this case, when 0 is fed back, it indicates that the PSSCH is not decoded. When 1 is fed back, it indicates that the auxiliary resource information cannot be provided.

2. A control channel is used to carry a negative answer in the SCI.

3. A data channel is used. For example, an indication indicating that the auxiliary resource information cannot be provided is carried in a MAC CE.

According to the foregoing method, the second terminal apparatus receives the first information from the first terminal apparatus, determines, based on the range indication information or the direction indication information carried in the first information, whether the second terminal apparatus is capable of providing the auxiliary resource information for the first terminal apparatus. When determining that the second terminal apparatus is capable of providing the auxiliary resource information, the second terminal apparatus sends the auxiliary resource information to the first terminal apparatus. When determining that the second terminal apparatus is incapable of providing the auxiliary resource information, the second terminal apparatus feeds back, to the first terminal apparatus, that the second terminal apparatus cannot provide assistance. It is determined, by using the geographical location, that the UE in the corresponding range feeds back the auxiliary resource information, so that system overheads are reduced. In addition, a UE range for information feedback is further narrowed by using a condition limitation. In this way, a terminal apparatus that needs to provide resource assistance is properly determined by using a geographical information indication, so that resource selection reliability is improved.

Figure 5:
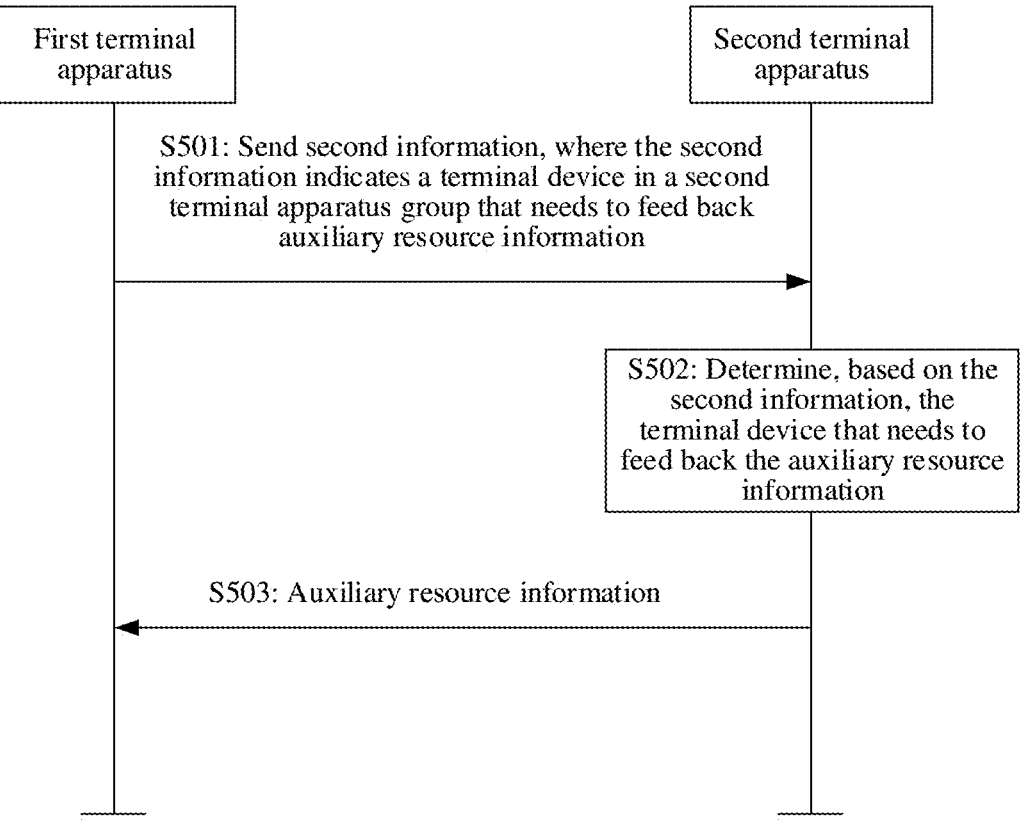
FIG. 5 is a schematic flowchart of another method according to an embodiment of this application.

FIG. 5 shows another communication method according to this application.

Step 501: A first terminal device sends second information to a second terminal device group, where the second information indicates a terminal device in the second terminal apparatus group that needs to feed back auxiliary resource information, and the second terminal device group includes at least one second terminal device.

Step 502: The second terminal device determines, based on the second information, the terminal device that needs to feed back the auxiliary resource information.

Step 503: The second terminal apparatus sends the auxiliary resource information to the first terminal apparatus.

Optionally, for a process of determining the second terminal device group, refer to descriptions about the second terminal device group in S201 to S203.

Optionally, after step 501, when the second terminal apparatus determines, based on the second information, that the second terminal apparatus is not the terminal device that needs to feed back the auxiliary resource information, the second terminal apparatus may feed back negative information to the first terminal apparatus. For a specific feedback manner of the negative information, refer to the foregoing feedback manner of the second indication information. Certainly, because the second information is determined by the first terminal apparatus, the first terminal apparatus is clear about UE that needs to feed back the auxiliary resource information and UE that does not need to feed back the auxiliary resource information. Therefore, the negative information may alternatively not be fed back.

The second information includes trigger information, and the trigger information indicates the terminal device that needs to feed back the auxiliary resource information in the second terminal group. Alternatively, the second information includes a bitmap, and the bitmap indicates the terminal device that needs to feed back the auxiliary resource information in the second terminal apparatus group. Optionally, the second information may be SCI or included in SCI.

Manner 1: Indication information, for example, 1-bit trigger information, may be carried in the second information. The information indicates all Ues that has fed back a NACK in initial transmission and retransmission of a same TB to provide the auxiliary resource information, or indicates a terminal that has fed back a NACK for more than N1 times, or a terminal that has fed back a NACK continuously for more than N2 times until the NACK is also fed back in current transmission. A reason for which the UE that feeds back the NACK is selected as auxiliary UE that provides the auxiliary resource information is that the UE that has fed back the NACK may consider that data reception is interfered by another terminal, and data cannot be correctly decoded due to a reason such as a poor channel condition, but SCI may be decoded. Because the UE suffers great interference in a communication process, a proper sending resource fed back by the UE is generally also applicable to other UE. Therefore, the UE that feeds back the auxiliary information may be indicated by using SCI signaling. This improves effectiveness of the auxiliary information, and avoids a case in which the auxiliary UE cannot be determined when the SCI cannot be interpreted. When SCI for scheduling initial transmission of a TB carries information that triggers resource assistance, all Ues in the group feed back the auxiliary resource information.

Figure 6:
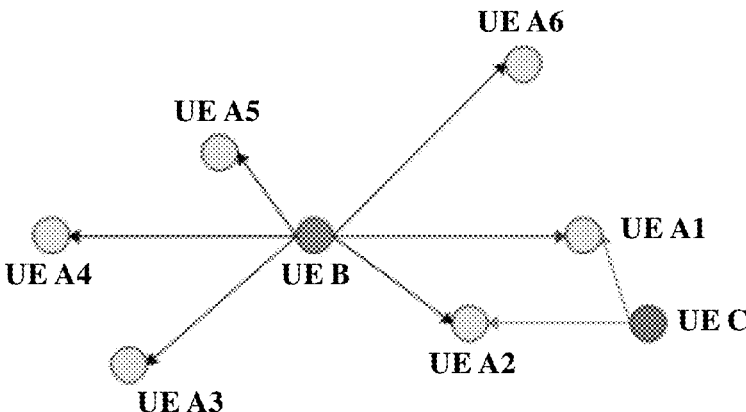
FIG. 6 is a schematic geographical diagram of an auxiliary resource feedback according to an embodiment of this application.

Manner 2: Indication information, for example, a group of bitmaps, is carried in the second information, to indicate UE that needs to feed back the auxiliary resource information. As shown in FIG. 6, a group of bitmaps with a length of 6 bits may indicate UE-A1 to UE-A6, and the Ues are sorted in ascending order of sizes of member IDs. MSB indicates UE with a smallest UE member ID. "110000" indicates that the UE-A1 and the UE-A2 feed back the auxiliary resource information. The UE that receives the second information may determine, based on a value in the bitmap, whether the UE needs to feed back the auxiliary resource information.

According to the method, the first terminal apparatus may select a specific UE to feed back auxiliary information, so that the first terminal controls an amount of the auxiliary resource information, to reduce overheads of an entire system.

When the first terminal apparatus uses a broadcast sending manner, the first terminal apparatus is not clear about receiving UE and a location of the receiving UE. Therefore, the first terminal apparatus may select, based on movement information of the first terminal apparatus, UE on a potential moving path to feed back the auxiliary information. An objective is to predict a resource occupation status in a future movement direction, and reduce inaccurate resource estimation caused by movement.

Figures 7, 8:
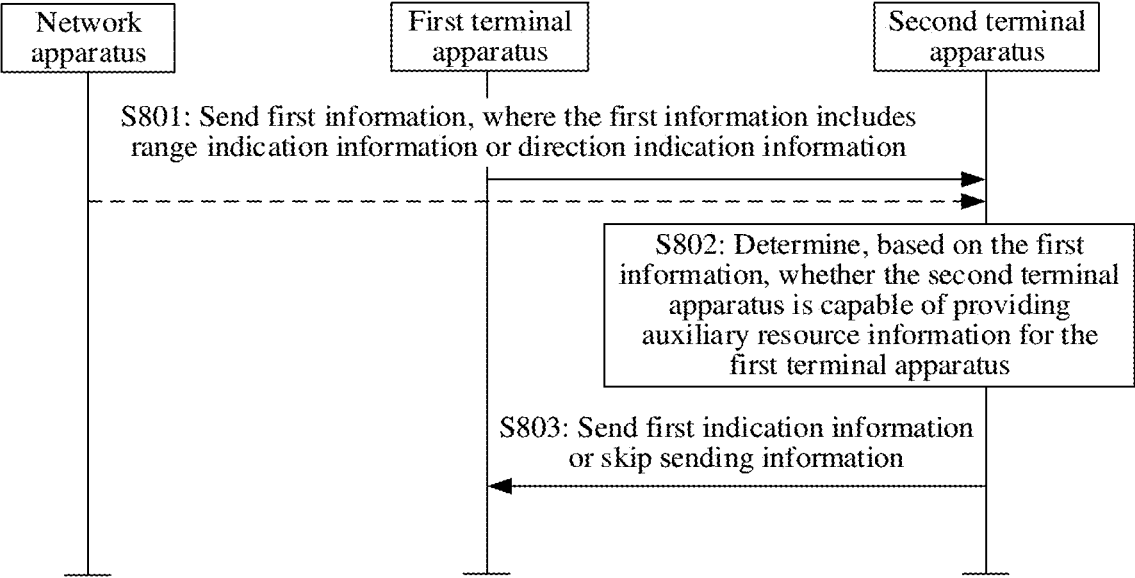
FIG. 7 is a schematic geographical diagram of an auxiliary resource feedback according to an embodiment of this application.
FIG. 8 is a schematic flowchart of still another method according to an embodiment of this application.

Refer to FIG. 7. The first terminal apparatus, namely, UE B, sends a zone ID of a zone to be entered and a probability of keeping a same movement direction. When the probability is greater than a threshold, UE in the next zone in the same direction needs to feed back the auxiliary resource information. As shown in the figure, the UE-B moves from a zone 8 to a zone 6, and a probability of moving to a zone 7 exceeds 80%. In this case, UE in the zone 7 may feed back the auxiliary resource information to the UE-B.

In this manner, in a broadcast scenario, UE that can feed back the auxiliary information is determined based on a movement direction of the UE. This can help the UE sense a resource occupation status of a future location in advance, and improve accuracy of a sensing result.

FIG. 8 is a schematic flowchart of a communication method according to an embodiment of this application. Refer to FIG. 8. The method includes the following steps.

Step 801: A second terminal apparatus receives first information. The first information includes range indication information or direction indication information.

Step 802: The second terminal apparatus determines, based on the first information, whether the second terminal apparatus is capable of providing auxiliary resource information for a first terminal apparatus, where the auxiliary resource information is for determining a sending resource of the first terminal apparatus.

Step 803: When the second terminal apparatus is capable of providing the auxiliary resource information for the first terminal apparatus, the second terminal apparatus sends first indication information to the first terminal apparatus, and the first terminal apparatus receives the first indication information from the second terminal apparatus, where the first indication information includes the auxiliary resource information.

For details of step 801 and step 802, refer to descriptions of step 201 and step 202 and a related part. For example, for a process in which the second terminal apparatus determines, based on the first information, whether the second terminal apparatus is capable of providing the auxiliary resource information for the first terminal apparatus in 802, refer to descriptions of content corresponding to step 202. Details are not described herein again.

In step 802, when the second terminal apparatus determines that the second terminal apparatus is capable of providing the auxiliary resource information for the first terminal apparatus, the second terminal apparatus performs step 803 to send the first indication information to the first terminal apparatus. For related descriptions of the first indication information, refer to a related part of the embodiment shown in FIG. 2. When the second terminal apparatus determines that the second terminal apparatus is incapable of providing the auxiliary resource information for the first terminal apparatus, the second terminal apparatus does not send information to the first terminal apparatus. In this case, only a terminal apparatus that is capable of providing the auxiliary resource information sends information to the first terminal apparatus, and a terminal apparatus that is incapable of providing the auxiliary resource information does not send information to the first terminal apparatus.

Optionally, the first terminal apparatus sends the first information. There is no specific receiver of the first information. For example, the first information is sent in a broadcast manner. Certainly, the first information may alternatively be sent in another manner, for example, sent to a terminal apparatus in a second terminal apparatus group in a multicast manner. In the multicast manner, the first terminal apparatus also belongs to the second terminal apparatus group. When the first terminal apparatus sends the first information in a broadcast manner or the receiver of the first information is not determined in advance, a quantity of second terminal apparatuses that receive the first information may be large. In this case, the terminal apparatus that is incapable of providing the auxiliary resource information may not provide feedback information for the first terminal apparatus to indicate that the auxiliary resource information cannot be provided, so as to avoid further resource congestion or low communication efficiency caused when the first terminal apparatus receives a large amount of useless information.

Embodiments described in this specification may be independent solutions, or may be combined based on internal logic. All these solutions fall within the protection scope of this application.

It may be understood that, in the foregoing method embodiments, the methods and the operations implemented by the terminal apparatus may alternatively be implemented by a component (for example, a chip or a circuit) used in the terminal apparatus, and the methods and the operations implemented by the network apparatus may alternatively be implemented by a component (for example, a chip or a circuit) used in the network apparatus.

In the foregoing embodiments provided in this application, the methods provided in embodiments of this application are described from a perspective of interaction between devices. To implement functions in the foregoing methods provided in embodiments of this application, the terminal apparatus and the network apparatus may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In this embodiment of this application, module division is an example, and is merely a logical function division. In actual implementation, another division manner may be used. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 9:
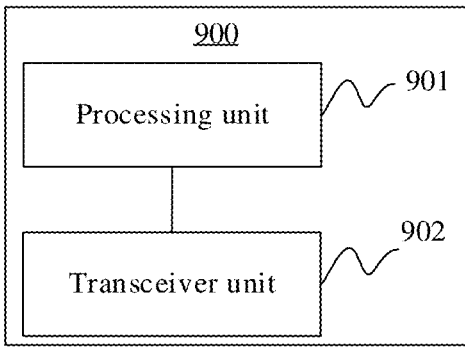
FIG. 9 is a schematic diagram of a structure of a communication apparatus according to an embodiment of this application.

Same as the foregoing concept, as shown in FIG. 9, an embodiment of this application further provides an apparatus 900, configured to implement a function of the terminal apparatus or the network apparatus in the foregoing methods. For example, the apparatus may be a software module or a chip system. In this embodiment of this application, the chip system may include a chip, or may include a chip and another discrete component. The apparatus 900 may include a processing unit 901 and a transceiver unit 902.

In this embodiment of this application, the transceiver unit may also be referred to as a transceiver module or a communication module, and may include a sending module and/or a receiving module, which are respectively configured to perform sending and receiving steps of the terminal apparatus or the network apparatus in the foregoing method embodiments.

Communication apparatus provided in embodiments of this application is described in detail with reference to FIG. 9 and FIG. 10. It should be understood that descriptions of apparatus embodiments correspond to the descriptions of the method embodiments. Therefore, for content that is not described in detail, refer to the foregoing method embodiments. For brevity, details are not described herein again.

In a possible design, the apparatus 900 may implement corresponding steps or procedures performed by the terminal apparatus or the network apparatus in the foregoing method embodiments. Descriptions are separately provided below.

For example, when the apparatus 900 implements a function of the second terminal apparatus in the procedure shown in FIG. 2:

The transceiver unit is configured to receive first information, where the first information includes range indication information or direction indication information.

The processing unit is configured to determine, based on the first information, whether a second terminal apparatus is capable of providing auxiliary resource information for a first terminal apparatus. The auxiliary resource information is for determining a sending resource of the first terminal apparatus. When the second terminal apparatus is capable of providing the auxiliary resource information for the first terminal apparatus, the transceiver unit is further configured to send first indication information to the first terminal apparatus, where the first indication information includes the auxiliary resource information. Alternatively, when the second terminal apparatus is incapable of providing the auxiliary resource information for the first terminal apparatus, the transceiver unit is further configured to send second indication information to the first terminal apparatus, where the second indication information indicates that the second terminal apparatus is incapable of providing the auxiliary resource information for the first terminal apparatus.

In an optional implementation, the range indication information indicates a geographical range in which a terminal apparatus that needs to feed back the auxiliary resource information is located; or the direction indication information indicates a geographical orientation, relative to the first terminal apparatus, of a terminal apparatus that needs to feed back the auxiliary resource information.

In an optional implementation, the range indication information is related to a priority of to-be-sent data of the first terminal apparatus and/or a current channel congestion degree.

In an optional implementation, the processing unit is further configured to determine, based on the range indication information or the direction indication information, that the second terminal apparatus is in a feedback range of the auxiliary resource information of the first terminal apparatus, and determine that the second terminal apparatus is capable of providing the auxiliary resource information for the first terminal apparatus. Alternatively, the processing unit is further configured to determine, based on the range indication information or the direction indication information, that the second terminal apparatus is not in a feedback range of the auxiliary resource information of the first terminal apparatus, and determine that the second terminal apparatus is incapable of providing the auxiliary resource information for the first terminal apparatus.

In an optional implementation, the transceiver unit is further configured to receive the first information from the first terminal apparatus, where the first information is for requesting the auxiliary resource information. Alternatively, the transceiver unit is further configured to receive the first information from a network apparatus.

In an optional implementation, the auxiliary resource information includes at least one of the following: a sending resource that the first terminal apparatus tends to use, a sending resource that the first terminal apparatus does not tend to use, a sending resource that conflicts with a sending resource of another terminal apparatus, or an indication indicating that there is a sending resource conflict.

Figure 10:
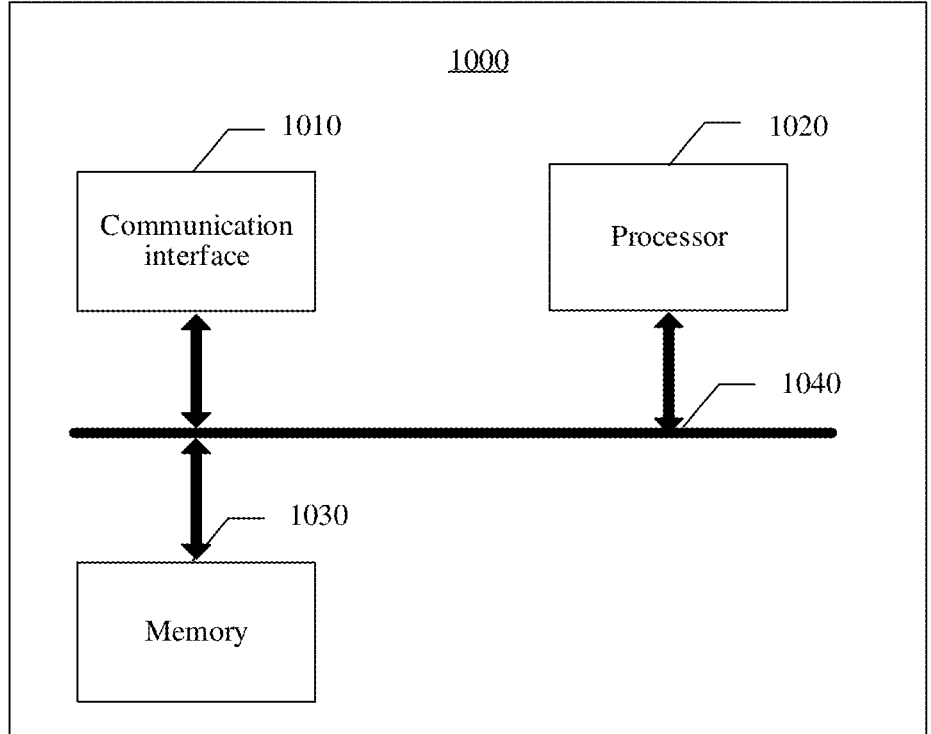
FIG. 10 is a schematic diagram of a structure of a communication apparatus according to an embodiment of this application.

FIG. 10 shows an apparatus 1000 according to an embodiment of this application. The apparatus shown in FIG. 10 may be an implementation of a hardware circuit of the apparatus shown in FIG. 9. The communication apparatus is applicable to the flowchart shown in FIG. 2, and performs a function of the terminal apparatus or the network apparatus in the foregoing method embodiments. For ease of description, FIG. 10 shows only main components of the communication apparatus.

The apparatus 1000 shown in FIG. 10 includes at least one processor 1020, a communication interface 1010, and a memory 1030. The processor 1020 is configured to execute instructions or a program stored in the memory 1030. When the instructions or the program stored in the memory 1030 is executed, the processor 1020 is configured to perform an operation performed by the processing unit 901 in the foregoing embodiment, and the communication interface 1010 is configured to perform an operation performed by the transceiver unit 902 in the foregoing embodiment.

The memory 1030 is configured to store program instructions and/or data. The memory 1030 is coupled to a processor 1020. The coupling in this embodiment of this application may be an indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1020 may execute the program instructions stored in the memory 1030. At least one of the at least one memory may be included in the processor.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device, and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clearly that, a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. An indication information sending method, comprising:

receiving, by a second terminal apparatus, first information, wherein the first information comprises range indication information or direction indication information;

determining, by the second terminal apparatus based on the first information, whether the second terminal apparatus is capable of providing auxiliary resource information for a first terminal apparatus, wherein the auxiliary resource information is for determining a sending resource of the first terminal apparatus; and in response to the second terminal apparatus being capable of providing the auxiliary resource information for the first terminal apparatus, sending, by the second terminal apparatus, first indication information to the first terminal apparatus, wherein the first indication information comprises the auxiliary resource information; or in response to the second terminal apparatus being incapable of providing the auxiliary resource information for the first terminal apparatus, sending, by the second terminal apparatus, second indication information to the first terminal apparatus, wherein the second indication information indicates that the second terminal apparatus is incapable of providing the auxiliary resource information for the first terminal apparatus.

2. The indication information sending method according to claim 1, wherein the range indication information indicates a geographical range in which a terminal apparatus that needs to feed back the auxiliary resource information is located; or the direction indication information indicates a geographical orientation, relative to the first terminal apparatus, of a terminal apparatus that needs to feed back the auxiliary resource information.

3. The indication information sending method according to claim 1, wherein the range indication information is related to one or more of a priority of to-be-sent data of the first terminal apparatus or a current channel congestion degree.

4. The indication information sending method according to claim 1, wherein the determining, by the second terminal apparatus based on the first information, whether the second terminal apparatus is capable of providing auxiliary resource information for the first terminal apparatus comprises:

determining, by the second terminal apparatus based on the range indication information or the direction indication information, that the second terminal apparatus is in a feedback range of the auxiliary resource information of the first terminal apparatus, and determining, by the second terminal apparatus, that the second terminal apparatus is capable of providing the auxiliary resource information for the first terminal apparatus; or determining, by the second terminal apparatus based on the range indication information or the direction indication information, that the second terminal apparatus is outside a feedback range of the auxiliary resource information of the first terminal apparatus, and determining, by the second terminal apparatus, that the second terminal apparatus is incapable of providing the auxiliary resource information for the first terminal apparatus.

5. The indication information sending method according to claim 1, wherein the second terminal apparatus belongs to a second terminal apparatus group, and the second terminal apparatus group is determined by a higher layer or the first terminal apparatus.

6. An indication information receiving method, comprising:

sending, by a first terminal apparatus, first information to at least one second terminal apparatus, wherein the first information comprises range indication information or direction indication information, and the first information is used by the at least one second terminal apparatus to determine whether the at least one second terminal apparatus is capable of providing auxiliary resource information for the first terminal apparatus; and receiving, by the first terminal apparatus, first indication information or second indication information from the second terminal apparatus, wherein the first indication information comprises the auxiliary resource information, the auxiliary resource information is used by the first terminal apparatus to determine a sending resource, and the second indication information indicates that the second terminal apparatus is incapable of providing the auxiliary resource information for the first terminal apparatus.

7. The indication information receiving method according to claim 6, wherein the first information is used by the at least one second terminal apparatus to determine whether the at least one second terminal apparatus is in a feedback range of the auxiliary resource information of the first terminal apparatus.

8. The indication information receiving method according to claim 6, wherein the at least one second terminal apparatus belongs to a second terminal apparatus group, and the second terminal apparatus group is determined by a higher layer or the first terminal apparatus.

9. An apparatus, comprising:

one or more processors configured to:

receive first information, wherein the first information comprises range indication information or direction indication information; and determine, based on the first information, whether the apparatus is capable of providing auxiliary resource information for a first terminal apparatus, wherein the auxiliary resource information is for determining a sending resource of the first terminal apparatus, wherein in response to the apparatus being capable of providing the auxiliary resource information for the first terminal apparatus, send first indication information to the first terminal apparatus, wherein the first indication information comprises the auxiliary resource information; or in response to the apparatus being incapable of providing the auxiliary resource information for the first terminal apparatus, send second indication information to the first terminal apparatus, wherein the second indication information indicates that the apparatus is incapable of providing the auxiliary resource information for the first terminal apparatus.

10. The apparatus according to claim 9, wherein the range indication information indicates a geographical range in which a terminal apparatus that needs to feed back the auxiliary resource information is located; or the direction indication information indicates a geographical orientation, relative to the first terminal apparatus, of a terminal apparatus that needs to feed back the auxiliary resource information.

11. The apparatus according to claim 9, wherein the range indication information is related to one or more of a priority of to-be-sent data of the first terminal apparatus or a current channel congestion degree.

12. The apparatus according to claim 9, wherein the processors further configured to:

determine, based on the range indication information or the direction indication information, that the apparatus is in a feedback range of the auxiliary resource information of the first terminal apparatus, and determine that the apparatus is capable of providing the auxiliary resource information for the first terminal apparatus; or determine, based on the range indication information or the direction indication information, that the apparatus is outside a feedback range of the auxiliary resource information of the first terminal apparatus, and determine that the apparatus is incapable of providing the auxiliary resource information for the first terminal apparatus.

13. An apparatus, comprising:

one or more processors configured to:

send first information to at least one second terminal apparatus, wherein the first information comprises range indication information or direction indication information, and the first information is used by the at least one second terminal apparatus to determine whether the at least one second terminal apparatus is capable of providing auxiliary resource information for the apparatus; and receive first indication information or second indication information from the second terminal apparatus, wherein the first indication information comprises the auxiliary resource information, the auxiliary resource information is for determining a sending resource, and the second indication information indicates that the second terminal apparatus is incapable of providing the auxiliary resource information for the apparatus.

14. The apparatus according to claim 13, wherein the first information is used by the at least one second terminal apparatus to determine whether the at least one second terminal apparatus is in a feedback range of the auxiliary resource information of the apparatus.

15. The apparatus according to claim 13, wherein the at least one second terminal apparatus belongs to a second terminal apparatus group, and the second terminal apparatus group is determined by a higher layer or a processing unit.

16. The apparatus according to claim 13, wherein the auxiliary resource information comprises at least one of a sending resource that the apparatus tends to use, a sending resource that the apparatus does not tend to use, a sending resource that conflicts with a sending resource of another terminal apparatus, or an indication indicating that there is a sending resource conflict.

* * * * *